(12) United States Patent
Miyabe et al.

(10) Patent No.: US 11,079,537 B2
(45) Date of Patent: Aug. 3, 2021

(54) OPTICAL FIBER AND MANUFACTURING METHOD OF OPTICAL FIBER

(71) Applicant: FURUKAWA ELECTRIC CO., LTD., Tokyo (JP)

(72) Inventors: Ryo Miyabe, Tokyo (JP); Keiichi Aiso, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/561,656

(22) Filed: Sep. 5, 2019

(65) Prior Publication Data
US 2019/0391323 A1 Dec. 26, 2019

Related U.S. Application Data

(63) Continuation of application No. PCT/JP2018/011858, filed on Mar. 23, 2018.

(30) Foreign Application Priority Data

Mar. 27, 2017 (JP) ............................. JP2017-061066

(51) Int. Cl.
*C03B 37/014* (2006.01)
*C03B 37/018* (2006.01)
(Continued)

(52) U.S. Cl.
CPC ......... *G02B 6/0288* (2013.01); *G02B 6/0281* (2013.01); *G02B 6/02395* (2013.01);
(Continued)

(58) Field of Classification Search
CPC .............. G02B 6/0288; G02B 6/02395; G02B 6/0281; G02B 6/0365; G02B 6/02;
(Continued)

(56) References Cited

U.S. PATENT DOCUMENTS 5,146,534 A 9/1992 Lines
5,410,567 A 4/1995 Brundage et al.
(Continued)

FOREIGN PATENT DOCUMENTS

CN 102225843 A 10/2011
CN 102627398 A 8/2012
(Continued)

OTHER PUBLICATIONS

International Search Report dated Jun. 12, 2018 in PCT/JP2018/011858, filed on Mar. 23, 2018 (with English Translation).
(Continued)

*Primary Examiner* — Ryan A Lepisto
(74) *Attorney, Agent, or Firm* — Oblon, McClelland, Maier & Neustadt, L.L.P.

(57) ABSTRACT

An optical fiber has a core to which chlorine is added and a clad to which fluorine is added, chlorine of 9000 to 13000 ppm is added to the core, a relative refractive index difference $\Delta 1$ of the core to a pure silica glass is 0.09 to 0.13%, a relative refractive index difference $\Delta 2$ of the clad to a pure silica glass is $-0.36$ to $-0.17\%$, a difference ($\Delta 1$-$\Delta 2$) between the relative refractive index difference $\Delta 1$ of the core and the relative refractive index difference $\Delta 2$ of the clad is larger than or equal to 0.30%, a mode field diameter at wavelength 1.31 μm is 8.8 to 9.6 μm, and a stress difference occurring at an interface between the core and the clad is lower than or equal to 60 MPa.

7 Claims, 4 Drawing Sheets

(51) Int. Cl.
*C03B 37/027* (2006.01)
*C03C 3/06* (2006.01)
*C03C 13/04* (2006.01)
*C03C 25/104* (2018.01)
*C03C 25/1065* (2018.01)
*G02B 6/02* (2006.01)
*G02B 6/028* (2006.01)
*G02B 6/036* (2006.01)
*C03B 37/03* (2006.01)

(52) U.S. Cl.
CPC .......... *G02B 6/0365* (2013.01); *C03B 37/018* (2013.01); *C03B 37/03* (2013.01); *C03C 13/04* (2013.01)

(58) Field of Classification Search
CPC ..... C03B 37/018; C03B 37/03; C03B 37/027; C03B 37/01446; C03B 37/01453; C03C 13/04; C03C 3/06; C03C 25/1065; C03C 25/104; C03C 25/607
See application file for complete search history.

(56) References Cited

U.S. PATENT DOCUMENTS

| | | | |
|---|---|---|---|
| 6,400,878 B1* | 6/2002 | Nagayama | C03B 37/029 385/123 |
| 7,231,121 B2* | 6/2007 | Park | C03C 13/046 385/123 |
| 7,251,158 B2 | 7/2007 | Hsia et al. | |
| 7,593,612 B2* | 9/2009 | Shimotakahara | G02B 6/03655 385/128 |
| 7,677,060 B2* | 3/2010 | Oku | C03B 37/02727 65/434 |
| 8,891,925 B2 | 11/2014 | Bickham et al. | |
| 9,020,316 B2* | 4/2015 | Bookbinder | G02B 6/02019 385/124 |
| 9,031,371 B2* | 5/2015 | Yonezawa | G02B 6/0281 385/124 |
| 9,594,210 B2* | 3/2017 | Bookbinder | C03B 37/018 |
| 9,802,858 B2* | 10/2017 | Bookbinder | C03B 37/014 |
| 10,197,728 B2 | 2/2019 | Borel et al. | |
| 2002/0097970 A1 | 7/2002 | Sasaoka | |
| 2003/0200772 A1 | 10/2003 | Foster et al. | |
| 2004/0013336 A1 | 1/2004 | Foster et al. | |
| 2007/0022786 A1 | 2/2007 | Foster et al. | |
| 2012/0198891 A1 | 8/2012 | Tamura et al. | |
| 2012/0198892 A1 | 8/2012 | Tamura et al. | |
| 2013/0044987 A1 | 2/2013 | Bickham et al. | |
| 2016/0304392 A1 | 10/2016 | Bookbinder et al. | |
| 2017/0003445 A1* | 1/2017 | Bookbinder | C03C 3/06 |

FOREIGN PATENT DOCUMENTS

| | | |
|---|---|---|
| CN | 102627400 A | 8/2012 |
| CN | 103827709 A | 5/2014 |
| CN | 105527675 A | 4/2016 |
| EP | 1 154 294 A1 | 11/2001 |
| JP | 5-24873 A | 2/1993 |
| JP | H10-045421 A | 7/1996 |
| JP | 10-45421 A | 2/1998 |
| JP | H10-310445 A | 11/1998 |
| JP | 3270148 B2 | 4/2002 |
| JP | 2003-519792 A | 6/2003 |
| JP | 2005-162610 A | 6/2005 |
| JP | 2005-523868 A | 8/2005 |
| JP | 2008-503028 A | 1/2008 |
| JP | 2012-053066 A | 3/2012 |
| JP | 2014-526066 A | 10/2014 |
| WO | WO 00/42458 A1 | 7/2000 |
| WO | 0151911 A1 | 11/2000 |
| WO | 03093183 A1 | 4/2003 |
| WO | WO 2016/168042 A1 | 10/2016 |

OTHER PUBLICATIONS

Written Opinion dated Jun. 12, 2018 in PCT/JP2018/011858, filed on Mar. 23, 2018.
Nagayama, K. et al. "Ultra-Low-Loss (0.1484 dB/km) pure silica core fibre and extension of transmission distance", Electronics Letters, vol. 38, Issue 20, 2002, pp. 1168-1169.
Combined Chinese Office Action and Search Report dated Jun. 19, 2020 in Patent Application No. 201880019172.X (with English language translation), 17 pages.
Japanese Office Action and Search Report dated Feb. 25, 2021 in Japanese Patent Application No. 2017-061066 with English translation, 8 pages.

* cited by examiner

OPTICAL FIBER AND MANUFACTURING METHOD OF OPTICAL FIBER

CROSS-REFERENCE TO RELATED APPLICATIONS

This application is a continuation application of International Application No. PCT/JP2018/011858, filed Mar. 23, 2018, which claims the benefit of Japanese Patent Application No. 2017-061066, filed Mar. 27, 2017. The contents of the aforementioned applications are incorporated herein by reference in their entireties.

TECHNICAL FIELD

The present invention relates to an optical fiber and a manufacturing method of an optical fiber.

BACKGROUND ART

For optical fibers used for long distance transmission, there is a demand for loss reduction in transmission loss. As a loss reduction technology for optical fibers, a method of suppressing Rayleigh scattering by using a pure silica core, a method of adding halogen, alkali metal, or the like to the core, or the like is known (Non Patent Literature 1, Patent Literatures 1 to 3).

Non Patent Literature 1 also proposes the structure in which a fluorine-doped cladding layer is provided around a pure silica core to reduce the refractive index of the cladding layer, and thereby a light is guided. Further, Patent Literature 1 discloses that a significantly small amount of chlorine is included in a pure quartz glass that will be a core in a fiber having the structure including a pure quartz core and a fluorine-added clad. Further, Patent Literature 2 discloses a silica-based optical fiber in which a core including $SiO_2$ further includes $K_2O$, $Rb_2O$, or the like. Furthermore, Patent Literature 3 discloses an optical fiber in which chloride and fluorine are added to a core region.

CITATION LIST

Patent Literature

Patent Literature 1: Japanese Patent No. 3106564
Patent Literature 2: Japanese Patent No. 3270148
Patent Literature 3: Japanese Patent Application Laid-Open No. 2008-503028

Non Patent Literature

Non Patent Literature 1: K. Nagayama. et al., "Ultra-low-loss (0.1484 dB/km) pure silica core fibre and extension of transmission distance", Electronics Letters, 2002, Volume 38, Issue 20, pp. 1168-1169

SUMMARY OF INVENTION

Technical Problem

As disclosed in Patent Literature 2, a method of adding alkali metal to the core is considered to be effective as a method of reducing transmission loss due to an effect of reducing a fictive temperature in a drawing process. When alkali metal is added to a core, however, it is difficult to increase the size of the core.

On the other hand, it is relatively easy to add chlorine or fluorine to the core as long as the amount thereof is small. Further, it is also possible to increase the size of the core to which the above materials are added. Patent Literature 1 discloses that, when a significantly small amount of chlorine is contained in a pure quartz glass that will be a core, the viscosity inside the core is reduced, and thereby a residual stress in a drawn optical fiber is reduced. According to Patent Literature 1, it is described that, with a reduced residual stress, the relative refractive index difference between the drawn core and clad substantially matches a measurement value obtained at a preform stage. However, Patent Literature 1 does not disclose details on a residual stress or the like that can realize low loss characteristics of optical fiber.

Further, with a reduced drawing tension, the residual stress itself can be reduced. To this end, however, the drawing rate is required to be reduced, and thus productivity decreases. Further, when the drawing rate is reduced, transmission loss due to Rayleigh scattering may increase.

Further, as disclosed in Patent Literature 3, in a case of a core to which chlorine and fluorine are both added, to obtain a desired value as a relative refractive index difference (core A) of the core to the clad, it is necessary to add a large amount of chlorine or a large amount of fluorine to the core. However, there is technical difficulty in adding a large amount of chlorine. Further, when a large amount of fluorine is added to the core, it is also necessary to add a large amount of fluorine to the clad, and as a result, the manufacturing cost increases, and Rayleigh scattering also increases.

The prevent invention intends to provide an optical fiber and a manufacturing method of an optical fiber that can reduce transmission loss while maintaining optical fiber characteristics even when drawing is performed at a high tension and a high rate.

Solution to the Problem

According to one aspect of the present invention, provided is an optical fiber having a core to which chlorine is added and a clad to which fluorine is added, wherein chlorine of 9000 to 13000 ppm is added to the core, a relative refractive index difference $\Delta 1$ of the core to a pure silica glass is 0.09 to 0.13%, a relative refractive index difference d2 of the clad to a pure silica glass is −0.36 to −0.17%, a difference ($\Delta 1-\Delta 2$) between the relative refractive index difference $\Delta 1$ of the core and the relative refractive index difference $\Delta 2$ of the clad is larger than or equal to 0.30%, a mode field diameter at a wavelength of 1.31 μm is 8.8 to 9.6 μm, and a stress difference occurring at an interface between the core and the clad is lower than or equal to 60 MPa.

According to another aspect of the present invention, provided is a manufacturing method of an optical fiber having: forming first silica soot by depositing silica microparticles; forming a core rod to which chlorine of 9000 to 13000 ppm is added by vitrifying the first silica soot while chlorine is added to the first silica soot; forming second silica soot by depositing silica microparticles on the core rod; forming a cladding layer to which fluorine is added by vitrifying the second silica soot while fluorine is added to the second silica soot to form a glass base material in which a relative refractive index difference $\Delta 1'$ of the core rod to a pure silica glass is 0.09 to 0.13%, a relative refractive index difference $\Delta 2'$ of the cladding layer to a pure silica glass is −0.36 to −0.17%, and difference ($\Delta 1'-\Delta 2'$) between the relative refractive index difference $\Delta 1'$ of the core rod and the relative refractive index difference Δ2' of the cladding layer is larger than or equal to 0.30%, and drawing the glass base material at a drawing rate that is higher than or equal to 150 m/min and a drawing tension of 8 to 60 gf.

Advantageous Effects of Invention

According to the present invention, it is possible to provide an optical fiber in which transmission loss is reduced while optical fiber characteristics are maintained even when drawing is performed at a high drawing tension (high tension) and a high drawing rate (high rate).

DESCRIPTION OF EMBODIMENTS

One Embodiment

An optical fiber and a manufacturing method of the optical fiber according to one embodiment of the present invention will be described by using FIG. 1 to FIG. 4. Note that terms not specifically defined in the present specification comply with the definition and the measurement methods in the International Telecommunication Union-Telecommunication Standardization Sector (ITUT) Recommendation G.650.1.

Figure 1:
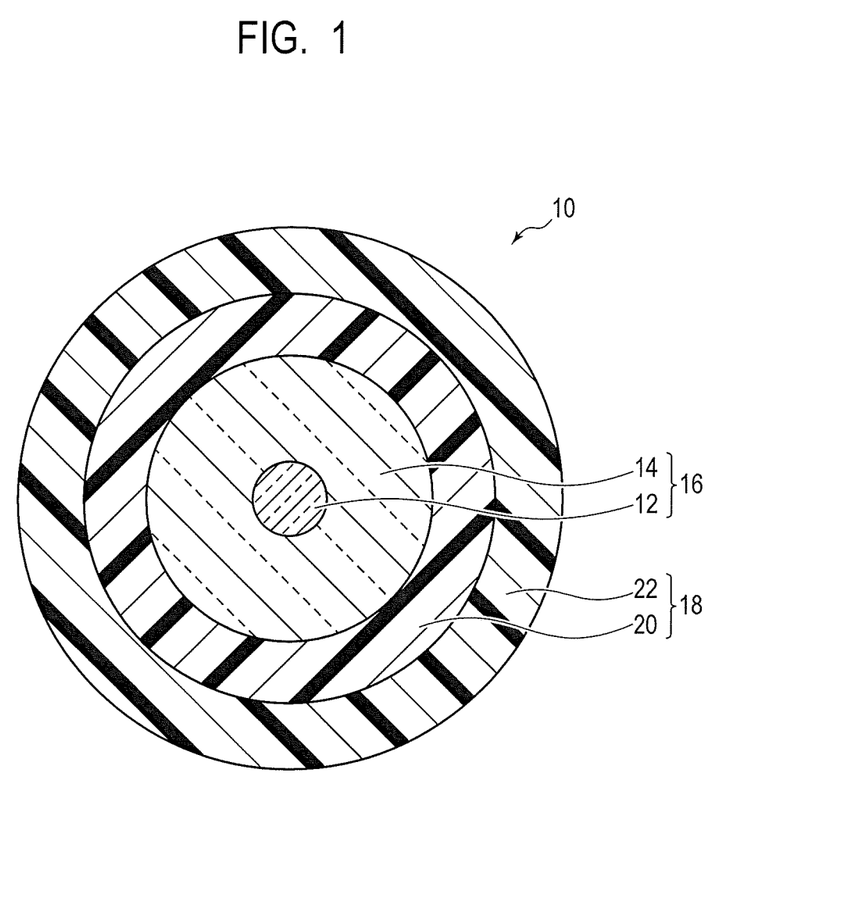
FIG. 1 is a sectional view illustrating an optical fiber according to one embodiment of the present invention.
Figure 2:
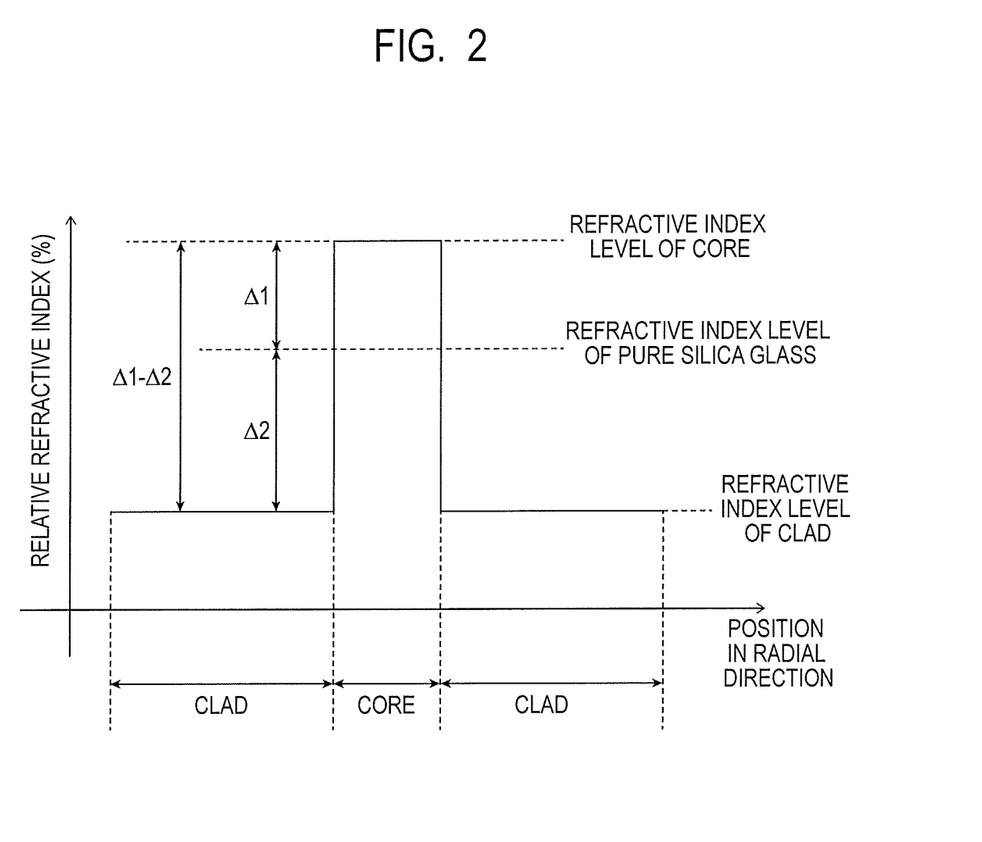
FIG. 2 is a diagram illustrating a refractive index profile along a radial direction in the optical fiber according to one embodiment of the present invention.

First, a configuration of an optical fiber according to the present embodiment will be described by using FIG. 1 and FIG. 2. FIG. 1 is a sectional view illustrating the optical fiber according to the present embodiment. FIG. 2 is a diagram illustrating a profile of the refractive index of the optical fiber in the radial direction according to the present embodiment.

As illustrated in FIG. 1, an optical fiber 10 according to the present embodiment is a single mode optical fiber and has a core 12 to which chlorine (Cl) is added and a clad 14 that is formed on the outer circumference of the core 12 and to which fluorine (F) is added. A glass optical fiber 16 is formed of the core 12 and the clad 14. Further, the optical fiber 10 according to the present embodiment has a coating layer 18 formed on the outer circumference of the clad 14 of the glass optical fiber 16. The coating layer 18 has a primary layer (primary coating layer) 20 formed on the outer circumference of the clad 14 and a secondary layer (secondary coating layer) 22 formed on the outer circumference of the primary layer 20.

The core 12 is made of a silica glass to which chlorine is added. To the core 12, chlorine of 9000 to 13000 ppm is added. With the concentration of chlorine added to the core 12 being higher than or equal to 9000 ppm, together with the addition of fluorine to the clad 14, even when drawing is performed at a high drawing tension (high tension) and a high drawing rate (high rate), it is possible to reduce a stress difference as described below and reduce transmission loss while maintaining optical fiber characteristics such as a Mode Filed Diameter (MFD). The reason when the concentration of chlorine is set to be lower than or equal to 13000 ppm is that addition of chlorine to a silica glass at a concentration higher than 13000 ppm is difficult, and this results in an increase in manufacturing cost. Note that, from the same viewpoint, it is preferable that chlorine of 10000 ppm or higher be preferably added, and it is more preferable that chlorine of 10000 to 13000 ppm be added to the core 12.

As described above, a relative refractive index difference Δ1 of the core 12 to which chlorine is added to a pure silica glass is 0.09 to 0.13% as described below in accordance with the added chlorine concentration. Note that the relative refractive index difference Δ1 is defined by Equation (1) below, where the refractive index of the pure silica glass is n0 and the refractive index of the core 12 is n1.

$$\Delta 1 = \{(n1-n0)/n0\} \times 100(\%) \qquad \text{Equation (1)}$$

The diameter of the core 12 is not particularly limited and may be 8 to 10 μm, for example.

The clad 14 is made of a silica glass to which fluorine is added. The clad 14 has a lower refractive index than the core 12. As described below, fluorine is added to the clad 14 at a concentration at which a relative refractive index difference Δ2 of the clad 14 to the pure silica glass is −0.36 to −0.17%. Note that the relative refractive index difference Δ2 is defined by Equation (2) below, where the refractive index of the pure silica glass is n0 and the refractive index of the clad 14 is n2.

$$\Delta 2 = \{(n2-n0)/n0\} \times 100(\%) \qquad \text{Equation (2)}$$

The diameter of the optical fiber 10 including the core 12 and the clad 14 is not particularly limited and may be 80 to 150 μm, for example, and specifically, 125 μm, for example.

The coating layer 18 has a function of protecting the core 12 and the clad 14 made of a silica glass, respectively. For example, the primary layer 20 forming the coating layer 18 is a soft material layer having a lower Young's modulus than the secondary layer 22, and the secondary layer 22 is a hard material layer having a higher Young's modulus than the primary layer 20. The primary layer 20 and the secondary layer 22 are made of a resin such as an ultraviolet curable resin, for example, respectively. Note that a material of the coating layer 18 is not particularly limited. Further, a layer forming the coating layer 18 is not limited to two layers of the primary layer 20 and the secondary layer 22, may be a single layer, or may be multiple layers having three or more layers.

A profile of the refractive index of the optical fiber 10 according to the present embodiment described above in the radial direction is illustrated in FIG. 2. The vertical axis of the profile illustrated in FIG. 2 represents relative refractive index (%) to the refractive index n0 of the pure silica glass. The horizontal axis of the profile illustrated in FIG. 2 represents position of the optical fiber 10 in the radial direction.

As can be seen from the profile illustrated in FIG. 2, due to the addition of chlorine to the core 12, the refractive index level of the core 12 is higher than the refractive index level of the pure silica glass. That is, the refractive index n1 of the core 12 is higher than the refractive index n0 of the pure silica glass. Specifically, due to the addition of chlorine of 9000 to 13000 ppm to the core 12 as described above, the relative refractive index difference Δ1 of the core 12 is 0.09 to 0.13%. Due to the addition of chlorine of 10000 ppm or higher to the core 12, the relative refractive index difference Δ1 is preferably higher than or equal to 0.1%. Due to the addition of chlorine of 10000 to 12000 ppm to the core 12, the relative refractive index difference Δ1 is more preferably 0.1 to 0.12%. Note that "ppm" refers to "mass ppm" in the present specification.

On the other hand, due to the addition of fluorine to the clad 14, the refractive index level of the clad 14 is lower than the refractive index level of the pure silica glass. That is, the refractive index n2 of the clad 14 is lower than the refractive index n0 of the pure silica glass. Specifically, due to the addition of fluorine to the clad 14, the relative refractive index difference Δ2 of the clad 14 is −0.36 to −0.17%. Note that the concentration of fluorine added to the clad 14 can be appropriately set so as to achieve the relative refractive index difference Δ2 in the range described above.

The difference (Δ1−Δ2) obtained by subtracting the relative refractive index difference Δ2 of the clad 14 from the relative refractive index difference Δ1 of the core 12 is higher than or equal to 0.30%. With the difference (Δ1−Δ2) between the relative refractive index difference Δ1 of the core 12 and the relative refractive index difference Δ2 of the clad 14 being higher than or equal to 0.30%, structure dispersion is suppressed, transmission loss is reduced, and the optical fiber 10 having superior transmission characteristics can be realized. Note that, from the same viewpoint, the difference (Δ1−Δ2) is preferably higher than or equal to 0.33%.

Further, a ratio Δ2/Δ1 of the relative refractive index difference Δ2 of the clad 14 to the relative refractive index difference Δ1 of the core 12 is preferably −3.9 to −1.3, and more preferably, −3.3 to −1.5. Due to the ratio Δ2/Δ1 being within such a range, viscosity matching between the core 12 and the clad 14 is obtained in the drawing, a residual stress occurring at the interface between the core 12 and the clad 14 is reduced, and transmission loss can be reduced.

A stress remains in the core 12 and the clad 14, and a distribution of a residual stress occurs in the radial direction of the optical fiber 10. More specifically, a tensile stress remains in the core 12. In at least a portion of the clad 14 neighboring the core 12, a tensile stress or a compressive stress that is smaller than the residual tensile stress in the core 12 remains. As a result, a stress difference occurs at the interface between the core 12 and the clad 14.

In the optical fiber 10 according to the present embodiment, due to the addition of chlorine to the core 12 and the addition of fluorine to the clad 14 as described above, a stress difference of 60 MPa or lower, preferably, 30 MPa or lower occurs at the interface between the core 12 and the clad 14. Note that the stress difference described here is an absolute value of the difference between the tensile stress and the compressive stress where the tensile stress is a positive value and the compressive stress is a negative value. In the optical fiber 10 according to the present embodiment, since the stress difference that occurs at the interface between the core 12 and the clad 14 is reduced as described above, transmission loss can be reduced.

The optical fiber 10 according to the present embodiment configured as described above is a fiber on which drawing at a high drawing tension and a high drawing rate is performed as described below, and even in such a case, reduction in transmission loss can be realized. Specifically, in the optical fiber 10 according to the present embodiment, the transmission loss of light in a 1.55 μm-wavelength band is lower than or equal to 0.174 dB/km. Further, in the optical fiber 10 according to the present embodiment, the transmission loss of light in a 1.31 μm wavelength band is lower than or equal to 0.314 dB/km. Furthermore, in the optical fiber 10 according to the present embodiment, the mode field diameter is 8.8 to 9.6 μm. The optical fiber 10 according to the present embodiment satisfies ITUT Recommendation G.652B or G.657A1 that is the international standard, for example.

As described above, according to the present embodiment, even when drawing is performed at a high drawing tension and a high drawing rate, it is possible to reduce transmission loss while maintaining optical fiber characteristics.

The optical fiber 10 according to the present embodiment can be used to form an optical fiber cable, for example, as optical transmission medium. The optical fiber cable using the optical fiber 10 according to the present embodiment has the reduced transmission loss and can be preferably used for long distance transmission.

Figure 3:
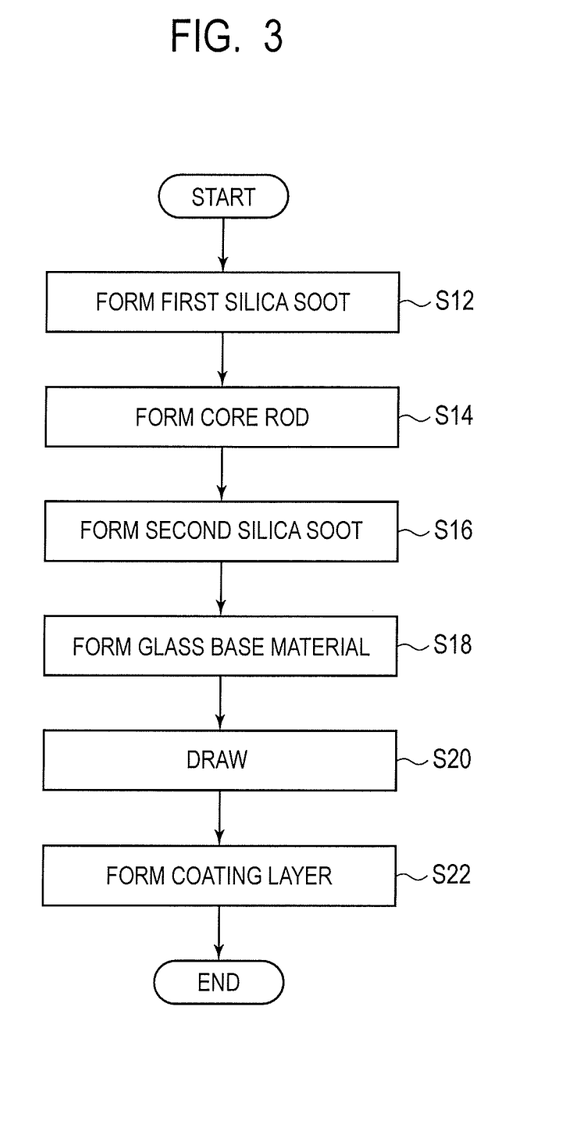
FIG. 3 is a flowchart illustrating a manufacturing method of the optical fiber according to one embodiment of the present invention.
Figure 4:
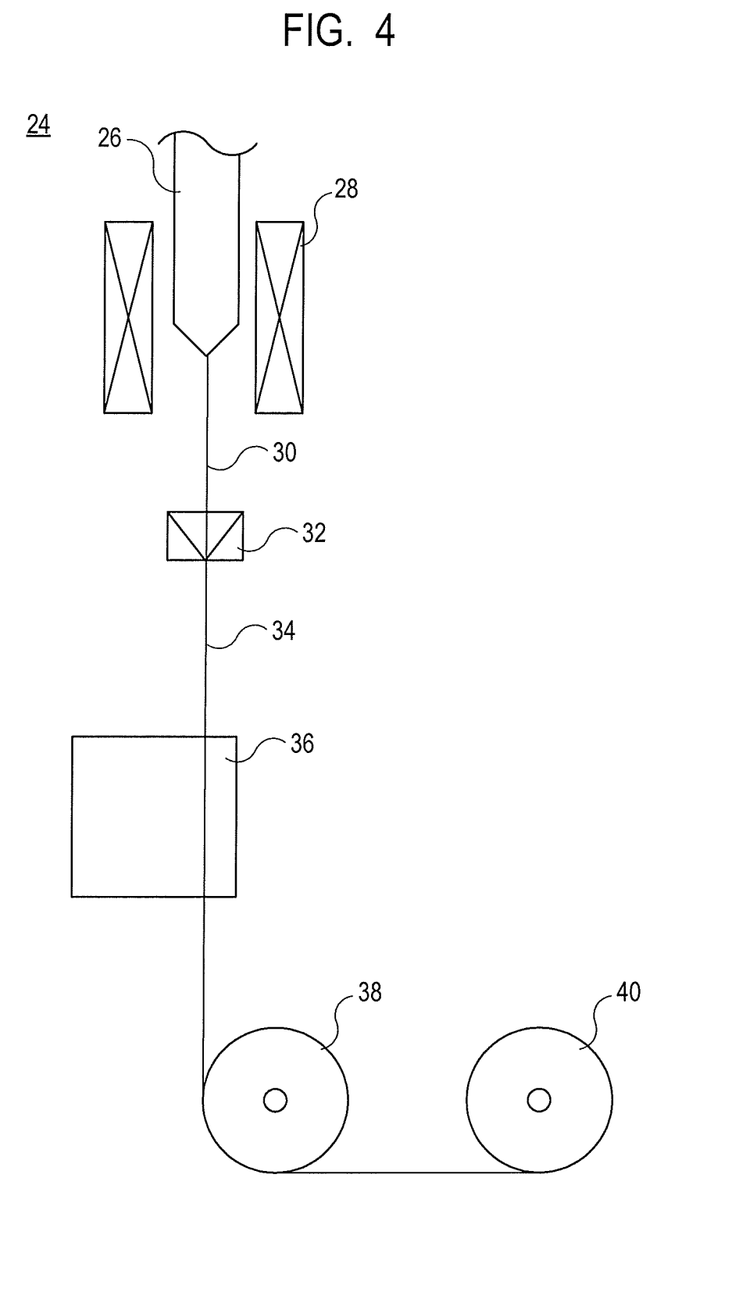
FIG. 4 is a schematic diagram illustrating a manufacturing apparatus used for the manufacturing method of the optical fiber according to one embodiment of the present invention.

Next, a manufacturing method of the optical fiber 10 according to the present embodiment will be further described by using FIG. 3 and FIG. 4. FIG. 3 is a flowchart illustrating the manufacturing method of the optical fiber 10 according to the present embodiment. FIG. 4 is a schematic diagram illustrating a manufacturing apparatus used for the manufacturing method of the optical fiber 10 according to the present embodiment.

The manufacturing method of the optical fiber 10 according to the present embodiment has forming first silica soot (step S12) and forming a core rod to which chlorine is added by vitrifying the first silica soot under the chlorine environment (step S14). The manufacturing method of the optical fiber 10 further has forming second silica soot on the outer circumference of the core rod (step S16). The manufacturing method of the optical fiber 10 further has forming a glass base material having the core rod and a cladding layer by forming the cladding layer to which fluorine is added by vitrifying the second silica soot under the fluorine environment (step S18). The manufacturing method of the optical fiber 10 further has forming a glass optical fiber 16 by drawing the glass base material (step S20) and forming a coating layer 18 by coating the drawn glass optical fiber 16 with a resin (step S22). Each step will be described in detail below.

First, in step S12, silica microparticles are deposited by, for example, a Vapor-phase Axial Deposition (VAD) method to form the first silica soot that will be a core rod. The core rod is used for forming the core 12 of the optical fiber 10. Note that the method of forming the first silica soot is not particularly limited, and various methods such as an Outside Vapor Deposition (OVD) method can be used in addition to the VAD method.

Subsequently, in step S14, the first silica soot is vitrified by heating the first silica soot, for example, in a furnace for vitrification to form a core rod formed by vitrification of the first silica soot. At this time, the first silica soot is heated under the chlorine environment by introducing a chlorine-containing gas containing chlorine such as chlorine ($Cl_2$), silicon tetrachloride ($SiCl_4$), carbon tetrachloride ($CCl_4$), sulfur dioxide ($SCl_2$), thionyl chloride ($COCl_2$), or the like into the furnace for vitrification, for example. Thereby, the first silica soot is vitrified while chlorine is added to the first silica soot, and a core rod to which chlorine is added is formed. The concentration of chlorine added to the core rod is approximately the same as the concentration of chlorine added to the core 12 of the optical fiber 10. That is, chlorine of 9000 to 13000 ppm, preferably chlorine of 10000 ppm or higher, more preferably chlorine of 10000 to 12000 ppm is added to the core rod. Note that the heating method to vitrify the first silica soot is not particularly limited, and various methods can be used.

Subsequently, in step S16, the second silica soot used for forming the clad 14 is externally formed on the outer circumference of the vitrified core rod. In the second silica soot formation, for example, glass microparticles are deposited on the outer circumference of the core rod by moving a burner used for glass microparticle synthesis forward and backward in the longitudinal direction of the core rod while rotating the core rod about the center axis that is a rotation axis. In such a way, glass microparticles are deposited on the core rod to form the second silica soot formed of glass microparticles deposited on the outer circumference of the core rod. Note that the forming method of the second silica soot is not particularly limited, and various methods can be used.

Subsequently, in step S18, the second silica soot is vitrified by heating the second silica soot formed on the outer circumference of the core rod, for example, in a furnace for vitrification. Thereby, a cladding layer made by vitrification of the second silica soot is formed on the outer circumference of the core rod. The cladding layer is used for forming the clad 14 of the optical fiber 10. At this time, the second silica soot is heated under the fluorine environment by introducing a fluorine-containing gas containing fluorine such as silicon tetrafluoride ($SiF_4$), sulfur hexafluoride ($SF_6$), carbon tetrafluoride ($CF_4$), or the like into the furnace for vitrification, for example. Thereby, the second silica soot is vitrified while fluorine is added to the second silica soot, and a cladding layer to which fluorine is added is formed. At this time, fluorine is added only to the cladding layer while no fluorine is added to the core rod. The concentration of fluorine added to the cladding layer is approximately the same as the concentration of fluorine added to the clad 14 of the optical fiber 10. The concentration of fluorine is appropriately set such that a predetermined relative refractive index difference $\Delta 2$ is obtained for the clad 14 as described above. Note that a heating method to vitrify the second silica soot is not particularly limited, and various methods can be used.

As described above, in step S18, a glass base material having a core rod to which chlorine is added and a cladding layer to which fluorine is added is formed.

A relative refractive index difference $\Delta 1'$ of the core rod in the glass base material to the pure silica glass is approximately the same as the relative refractive index difference $\Delta 1$ of the core 12 in the optical fiber 10 to the pure silica glass. Further, a relative refractive index difference $\Delta 2'$ of the cladding layer in the glass base material to the pure silica glass is approximately the same as the relative refractive index difference $\Delta 2$ of the clad 14 in the optical fiber 10 to the pure silica glass. That is, the relative refractive index difference $81'$ of the core rod to the pure silica glass is 0.09 to 0.13%. The relative refractive index difference $\Delta 2'$ of the cladding layer to the pure silica glass is −0.36 to −0.17%. The difference ($\Delta 1'-\Delta 2'$) between the relative refractive index difference $\Delta 1'$ of the core rod and the relative refractive index difference $\Delta 2'$ of the cladding layer is higher than or equal to 0.30%. Further, the preferable ranges for the relative refractive index differences $\Delta 1'$ and $\Delta 2'$ and the difference ($\Delta 1'-\Delta 2'$) are approximately the same as the preferable ranges for the relative refractive index differences $\Delta 1$ and $\Delta 2$ and the difference ($\Delta 1-\Delta 2$), respectively. Note that the relative refractive index difference $\Delta 1'$ and $\Delta 2'$ are defined as Equations (3) and (4) below, respectively, where the refractive index of the pure silica glass is n0, the refractive index of the core rod is n1', and the refractive index of the cladding layer is n2'.

$$\Delta 1'=\{(n1'-n0)/n0\}\times 100(\%) \quad \text{(Equation 3)}$$

$$\Delta 2'=\{(n2'-n0)/n0\}\times 100(\%) \quad \text{(Equation 4)}$$

Subsequently, in step S20 and step S22, drawing of the glass base material and forming of the coating layer 18 are sequentially performed. FIG. 4 illustrates a manufacturing apparatus 24 to perform drawing of the glass base material in step S20 and forming of the coating layer 18 in step S22.

As illustrated in FIG. 4, in the manufacturing apparatus 24, a heater 28 that is a heater apparatus is arranged around a glass base material 26 formed in step S18.

A resin application apparatus (dies) 32 that applies an ultraviolet curable resin on the outer circumference of a glass optical fiber 30 is provided under the heater 28. The resin application apparatus 32 separately holds a coating material for the primary layer 20 and a coating material for the secondary layer 22.

An ultraviolet irradiation apparatus 36 that irradiates the glass optical fiber 34 coated with the coating material used for the primary layer 20 and the coating material used for the secondary layer 22 with the ultraviolet ray is provided under the resin application apparatus 32. The ultraviolet irradiation apparatus 36 has any ultraviolet source such as a semiconductor light emitting device, a mercury lamp, or the like.

A guide roller 38 that guides the glass optical fiber (that is, the optical fiber 10 in FIG. 1) having the outer circumference on which the primary layer 20 and the secondary layer 22 are formed is provided under the ultraviolet irradiation apparatus 36. A winding apparatus 40 that winds the optical fiber guided by the guide roller 38 is provided on the side of the guide roller 38.

First, in step S20, the end of the glass base material 26 is heated by the heater 28 and melted, and the glass optical fiber 30 (that is, the glass optical fiber 16 in FIG. 1) is drawn out by drawing.

In step S20, the glass base material is drawn at a drawing rate that is higher than or equal to 150 m/min and a drawing tension of 8 to 60 gf. Even when the drawing is performed at such a high drawing rate and such a high drawing tension, by adding chlorine to the core rod and adding fluorine to the cladding layer as described above, it is possible to reduce the residual stress in the optical fiber 10 and reduce transmission loss. Note that, in terms of reducing the residual stress in the optical fiber 10, it is preferable that the drawing rate be lower than or equal to 1000 m/min. Further, in terms of improving productivity, it is preferable that the drawing rate be higher than or equal to 300 m/min, and it is more preferable that the drawing rate be higher than or equal to 600 m/min. That is, it is preferable that the drawing rate be 300 to 1000 m/min, and it is more preferable that the drawing rage be 600 to 1000 m/min.

Subsequently, in step S22, the coating material used for the primary layer 20 and the coating material used for the secondary layer 22 are collectively applied to the glass optical fiber 30 drawn from the glass base material 26 by the resin application apparatus 32.

The glass optical fiber 34 to which the ultraviolet curable resin is applied by the resin application apparatus 32 enters the ultraviolet irradiation apparatus 36 and is irradiated with the ultraviolet ray. As a result, two layers of ultraviolet curable resins coated on the outer circumference of the glass optical fiber 34 are cured, and the two layers of ultraviolet curable resins become the primary layer 20 and the secondary layer 22. In such a way, in step S22, the coating layer 18 having the primary layer 20 and the secondary layer 22 is formed.

Note that, in the above description, while the Wet-On-Wet method in which the primary layer 20 and the secondary layer 22 are applied by one die and cured is used, the Wet-On-Dry method in which the primary layer 20 and the secondary layer 22 are applied by separate dies and cured may be used. Further, step S22 in which the coating layer 18 is formed is not necessarily required to be sequentially performed after drawing in step S20 and is an optional step that may be performed separately.

The glass optical fiber (that is, the optical fiber 10 in FIG. 1) having the outer circumference on which the primary layer 20 and the secondary layer 22 are formed is guided by the guide roller 38 and winded by the winding apparatus 40.

As described above, the optical fiber 10 according to the present embodiment is manufactured.

Next, estimation results on the optical fiber according to the present embodiment will be described.

Example 1

Additive-free silica soot was formed in a VAD facility. This additive-free silica soot was vitrified with chlorine being added in a vitrification facility to form a transparent core rod. To the formed core rod, chlorine of 10000 ppm was added. Further, the relative refractive index difference $\Delta 1$ of the core rod to the pure silica glass was 0.1%. To this core rod, outside deposition of the silica soot was performed to form the clad portion. By vitrifying the silica soot deposited outside of the core rod while flowing $SiF_4$, a cladding layer to which fluorine was added was formed on the outer circumference of the core rod. The relative refractive index difference $\Delta 2$ of the cladding layer to which fluorine was added to the pure silica glass was −0.255%. In the glass base material formed in such a way, a ratio d1:d2 of the outer diameter d1 of a portion forming the core to the outer diameter d2 of a portion forming the clad was 1:13.9. Further, the outer diameter of the glass base material was 80 mm. Drawing was performed on the formed glass base material under a condition that the drawing rate was 300 m/min, and the drawing tension was 18 gf to form an optical fiber. For the transmission loss characteristics of the formed optical fiber, the transmission loss of light in the 1.55 μm-wavelength band was 0.166 dB/km, and the transmission loss of light in the 1.31 μm-wavelength band was 0.296 dB/km. Further, the stress difference occurring at the interface between the core and the clad was 25 MPa. Further, the mode field diameter (MFD) of this optical fiber at a wavelength of 1.31 μm was 9.10 μm.

Examples 2 to 20 and Comparative Examples 1 to 9

In Examples 2 to 20 and Comparative Examples 1 to 9, the condition in Example 1 described above was partially changed as illustrated in Table 1 described below to manufacture optical fibers.

The conditions and the estimation results of each Example and Comparative Example are illustrated in Table. 1. Note that, out of the items in Table. 1, the item "Chlorine Concentration" indicates the concentration of chlorine in the core of the optical fiber. The item "Loss in 1.55 μm" indicates the transmission loss of light in the 1.55 μm-wavelength band. Further, the item "Loss in 1.33 μm" indicates the transmission loss of light in the 1.31 μm-wavelength band. The item "Stress Difference" indicates a stress difference occurring at the interface between the core and the clad of the optical fiber. The item "MFD" indicates a mode field diameter of the optical fiber at a wavelength of 1.31 μm.

TABLE 1

| | Concentration of Chlorine [ppm] | $\Delta 1$ [%] | $\Delta 2$ [%] | $\Delta 1 - \Delta 2$ [%] | $\Delta 2/\Delta 1$ | Stress Difference [MPa] | Drawing Tension [gf] | Drawing Rate [m/min] | MFD [μm] | Loss at 1.55 μm [dB/km] | Loss at 1.31 μm [dB/km] |
|---|---|---|---|---|---|---|---|---|---|---|---|
| Example 1 | 10000 | 0.1 | −0.255 | 0.355 | −2.55 | 25 | 18 | 300 | 9.10 | 0.166 | 0.296 |
| Example 2 | 9000 | 0.09 | −0.3 | 0.38 | −3.33 | 52 | 15 | 200 | 8.95 | 0.172 | 0.312 |
| Example 3 | 11000 | 0.11 | −0.25 | 0.36 | −2.27 | 34 | 26 | 450 | 9.05 | 0.167 | 0.296 |
| Example 4 | 12100 | 0.121 | −0.245 | 0.366 | −2.02 | 20 | 20 | 300 | 9.02 | 0.164 | 0.295 |
| Example 5 | 11500 | 0.115 | −0.25 | 0.365 | −2.17 | 37 | 42 | 510 | 9.03 | 0.167 | 0.295 |
| Example 6 | 9000 | 0.09 | −0.31 | 0.39 | −3.44 | 58 | 24 | 150 | 8.92 | 0.171 | 0.311 |
| Example 7 | 9000 | 0.09 | −0.31 | 0.39 | −3.44 | 42 | 15 | 150 | 8.92 | 0.169 | 0.308 |
| Example 8 | 9000 | 0.09 | −0.31 | 0.38 | −3.44 | 28 | 8 | 150 | 8.93 | 0.169 | 0.307 |
| Example 9 | 13000 | 0.13 | −0.23 | 0.36 | −1.77 | 30 | 48 | 600 | 9.04 | 0.168 | 0.299 |
| Example 10 | 12000 | 0.12 | −0.23 | 0.35 | −1.92 | 60 | 60 | 1000 | 9.21 | 0.174 | 0.314 |
| Example 11 | 13000 | 0.13 | −0.17 | 0.3 | −1.31 | 27 | 25 | 400 | 9.60 | 0.166 | 0.296 |
| Example 12 | 10000 | 0.1 | −0.26 | 0.36 | −2.60 | 25 | 10 | 300 | 9.05 | 0.168 | 0.297 |
| Example 13 | 10000 | 0.1 | −0.26 | 0.36 | −2.60 | 27 | 17 | 300 | 9.04 | 0.169 | 0.299 |
| Example 14 | 10000 | 0.1 | −0.29 | 0.39 | −2.90 | 31 | 24 | 300 | 8.93 | 0.171 | 0.303 |
| Example 15 | 10500 | 0.105 | −0.26 | 0.365 | −2.48 | 23 | 10 | 300 | 9.04 | 0.167 | 0.296 |
| Example 16 | 9400 | 0.094 | −0.27 | 0.364 | −2.87 | 45 | 21 | 350 | 9.03 | 0.172 | 0.308 |
| Example 17 | 10400 | 0.104 | −0.285 | 0.368 | −2.74 | 37 | 13 | 150 | 9.02 | 0.168 | 0.305 |
| Example 18 | 9100 | 0.091 | −0.27 | 0.361 | −2.97 | 49 | 25 | 300 | 8.99 | 0.173 | 0.310 |
| Example 19 | 11000 | 0.11 | −0.22 | 0.33 | −2.00 | 35 | 25 | 400 | 9.42 | 0.169 | 0.301 |
| Example 20 | 9300 | 0.093 | −0.36 | 0.453 | −3.87 | 55 | 10 | 150 | 8.80 | 0.174 | 0.313 |
| Comparative Example 1 | 7500 | 0.075 | −0.31 | 0.37 | −4.13 | 80 | 15 | 150 | 9.00 | 0.175 | 0.315 |
| Comparative Example 2 | 6000 | 0.06 | −0.31 | 0.37 | −5.17 | 110 | 22 | 300 | 8.97 | 0.177 | 0.318 |
| Comparative Example 3 | 10000 | 0.1 | −0.26 | 0.36 | −2.6 | 15 | 5 | 300 | 9.12 | 0.178 | 0.320 |
| Comparative Example 4 | 10000 | 0.1 | −0.26 | 0.36 | −2.6 | 70 | 65 | 300 | 9.05 | 0.176 | 0.318 |
| Comparative Example 5 | 12000 | 0.12 | −0.23 | 0.35 | −1.92 | 80 | 40 | 1200 | 9.13 | 0.176 | 0.316 |

TABLE 1-continued

| | Concentration of Chlorine [ppm] | Δ1 [%] | Δ2 [%] | Δ1 − Δ2 [%] | Δ2/Δ1 | Stress Difference [MPa] | Drawing Tension [gf] | Drawing Rate [m/min] | MFD [μm] | Loss at 1.55 μm [dB/km] | Loss at 1.31 μm [dB/km] |
|---|---|---|---|---|---|---|---|---|---|---|---|
| Comparative Example 6 | 7000 | 0.07 | −0.29 | 0.36 | −4.14 | 88 | 15 | 150 | 9.09 | 0.176 | 0.317 |
| Comparative Example 7 | 8000 | 0.08 | −0.36 | 0.44 | −4.50 | 62 | 18 | 300 | 8.82 | 0.175 | 0.316 |
| Comparative Example 8 | 9800 | 0.98 | −0.38 | 0.48 | −0.39 | 50 | 20 | 300 | 8.70 | 0.176 | 0.318 |
| Comparative Example 9 | 11000 | 0.11 | −0.15 | 0.26 | −1.36 | 40 | 15 | 300 | 9.75 | 0.173 | 0.313 |

As illustrated in Table 1, it can be seen that both the transmission loss of light in the 1.55 μm-wavelength band and the transmission loss of light in the 1.31 μm-wavelength band are reduced in all the examples compared to all the comparative examples. Therefore, according to the present embodiment, it was confirmed that transmission loss was reduced while optical fiber characteristics were maintained even when drawing was performed at a high drawing tension and a high drawing rate.

The present invention is not limited to the embodiments described above and can be properly changed within the scope not departing from the spirit of the present invention.

LIST OF REFERENCE NUMERALS

10: optical fiber
12: core
14: clad
16: glass optical fiber
18: coating layer
20: primary layer (primary coating layer)
22: secondary layer (secondary coating layer)

The invention claimed is:

1. An optical fiber comprising:
a core to which chlorine is added; and
a clad to which fluorine is added,
wherein chlorine of 9000 to 13000 ppm is added to the core,
wherein a relative refractive index difference Δ1 of the core to a pure silica glass is 0.09 to 0.13%,
wherein a relative refractive index difference Δ2 of the clad to a pure silica glass is −0.36 to −0.17%,
wherein a difference (Δ1−Δ2) between the relative refractive index difference Δ1 of the core and the relative refractive index difference Δ2 of the clad is larger than or equal to 0.30%,
wherein a mode field diameter at a wavelength of 1.31 μm is 8.8 to 9.6 μm,
wherein a stress difference occurring at an interface between the core and the clad is lower than or equal to 60 MPa, and
wherein a value of a ratio Δ2/Δ1 of the relative refractive index difference Δ2 of the clad to the relative refractive index difference Δ1 of the core is −3.3 to −1.5.

2. The optical fiber according to claim 1, wherein a concentration of chlorine added to the core is higher than or equal to 10000 ppm.

3. The optical fiber according to claim 1, wherein the relative refractive index difference Δ2 of the clad is higher than or equal to −0.30%.

4. The optical fiber according to claim 1, wherein a stress difference occurring at the interface between the core and the clad is lower than or equal to 30 MPa.

5. The optical fiber according to claim 1, wherein transmission loss of light in a 1.55 μm-wavelength band is lower than or equal to 0.174 dB/km.

6. The optical fiber according to claim 1, wherein transmission loss of light in a 1.31 μm-wavelength band is lower than or equal to 0.314 dB/km.

7. An optical fiber cable using the optical fiber according to claim 1.

* * * * *